(12) United States Patent
Li et al.

(10) Patent No.: US 12,150,108 B2
(45) Date of Patent: Nov. 19, 2024

(54) TRANSMISSION METHOD AND APPARATUS, DEVICE, SYSTEM AND STORAGE MEDIUM

(71) Applicant: ZTE Corporation, Guangdong (CN)

(72) Inventors: Xincai Li, Guangdong (CN); Yajun Zhao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 399 days.

(21) Appl. No.: 17/487,481

(22) Filed: Sep. 28, 2021

(65) Prior Publication Data

US 2022/0124730 A1 Apr. 21, 2022

Related U.S. Application Data

(63) Continuation of application No. PCT/CN2020/077669, filed on Mar. 4, 2020.

(30) Foreign Application Priority Data

Mar. 29, 2019 (CN) .......................... 201910251620.5

(51) Int. Cl.
*H04W 72/12* (2023.01)
*H04W 74/08* (2009.01)

(52) U.S. Cl.
CPC ........... *H04W 72/12* (2013.01); *H04W 74/08* (2013.01)

(58) Field of Classification Search
None
See application file for complete search history.

(56) References Cited

U.S. PATENT DOCUMENTS

| | | | |
|---|---|---|---|
| 2014/0341053 | A1 | 11/2014 | Bhushan et al. |
| 2018/0092043 | A1 | 3/2018 | Yerramalli et al. |
| 2019/0069256 | A1 | 2/2019 | Jung et al. |
| 2019/0150124 | A1* | 5/2019 | Nogami ................ H04L 5/0044 370/330 |
| 2019/0253200 | A1* | 8/2019 | Salem ............... H04W 74/0808 |
| 2019/0306700 | A1* | 10/2019 | Lin ........................ H04W 72/23 |
| 2020/0358586 | A1* | 11/2020 | Takeda .................. H04L 5/0042 |
| 2020/0374967 | A1* | 11/2020 | Nogami ............ H04W 72/0446 |
| 2021/0111824 | A1* | 4/2021 | Park ..................... H04J 11/0076 |

(Continued)

FOREIGN PATENT DOCUMENTS

| | | |
|---|---|---|
| CN | 108886820 A | 11/2018 |
| CN | 109275191 A | 1/2019 |

(Continued)

OTHER PUBLICATIONS

Huawei et al.; "NRU wideband BWP operation"; 3GPP TSG RAN WG1 Meeting #96 R1-1901529 Athens, Greece; Feb. 25-Mar. 1, 2019; 8 gages.

(Continued)

*Primary Examiner* — Phuoc H Nguyen
(74) *Attorney, Agent, or Firm* — Crowell & Moring LLP

(57) ABSTRACT

Provided are a transmission method and apparatus, a device, a system and a storage medium. The transmission method includes: allocating to-be-transmitted information to at least one resource subset of a target transmission resource, where the target transmission resource is divided into a plurality of resource subsets; and transmitting corresponding to-be-transmitted information on the allocated at least one resource subset.

20 Claims, 6 Drawing Sheets

Allocating to-be-transmitted information to one or more resource subsets of a target transmission resource, where the target transmission resource is divided into a plurality of resource subsets — S11

Transmit corresponding to-be-transmitted information on the allocated resource subset — S12

(56) References Cited

U.S. PATENT DOCUMENTS

2021/0235492 A1\* 7/2021 Iyer .................. H04W 74/0808
2021/0306986 A1\* 9/2021 Takahashi ............. H04W 68/00
2021/0314114 A1\* 10/2021 Seo ....................... H04L 1/0071

FOREIGN PATENT DOCUMENTS

| CN | 109392176 A | 2/2019 |
|---|---|---|
| CN | 109417792 A | 3/2019 |
| CN | 109479321 A | 3/2019 |
| CN | 110536437 A | 12/2019 |
| KR | 10-2018-0122564 A | 11/2018 |
| RU | 2667513 C2 | 9/2018 |
| WO | WO 2013/107250 A1 | 7/2013 |
| WO | WO 2014/189913 A1 | 11/2014 |
| WO | WO 2017/193843 A1 | 5/2017 |
| WO | WO 2019/029640 A1 | 2/2019 |

OTHER PUBLICATIONS

Huawei et al.; "HARQ enhancements in NR unlicensed"; 3GPP TSG RAN WG1 Meeting #96 R1-1901527 Athens, Greece; Feb. 25-Mar. 1, 2019; 11 gages.

Huawei et al.; "UL channels and signals in NR unlicensed band"; 3GPP TSG RAN WG1 Meeting #96 R1-1901524 Athens, Greece; Feb. 25-Mar. 1, 2019; 12 gages.

Examination Report No. 1 dated Dec. 21, 2022 for Australian Patent Application No. 2020255518.

Chinese Office Action with English Translation, dated Aug. 16, 2023, pp. 1-27, issued in Chinese Patent Application No. 20221064810. X, China National Intellectual Progertx Administration, Beijing, China.

Canadian Examination Report, dated Jul. 20, 2023, pp. 1-5, issued in Canadian Patent Application No. 3,131,842, Canadian Intellectual Property Office, Gatineau, Quebec.

LG Electronics; "3GPP TSG RAN WGI #96 R1-1903595"; Summary #2 on Wide-band Ogeration for NR-U; Progosal Submission; Feb. 28, 2019; 16 pages.

Nokia et al.; "3GPP TSG RAN WG1#95 R1-1813994" Feature Lead's Summary on Channel Access Procedures; Proposal Submission; Nov. 14, 2018; 22 pages.

International Search Report mailed May 29, 2020 for International Application No. PCT/CN2020/077669.

Official Action dated Jun. 16, 2022 for Russian Application No. 2021131354.

Search Report completed Jun. 7, 2022 for Russian Application No. 2021131354.

Indonesian Office Action with English Translation, dated Oct. 27, 2023, pp. 1-6, issued in Indonesian Patent Application No. P00202108069.

Examination Report No. 2 dated Jun. 26, 2023 for Australian Patent Application No. 2020255518.

Communication pursuant to Article 94(3) EPC dated Aug. 30, 2024 for European Patent Application No. 20 783 372.4-1215 (7 pages).

\* cited by examiner

TRANSMISSION METHOD AND APPARATUS, DEVICE, SYSTEM AND STORAGE MEDIUM

This application is based on and claims priority to International PCT Application No. PCT/CN2020/077669 filed with the China National Intellectual Property Administration (CNIPA) on Mar. 4, 2020, which claims priority to Chinese Patent Application No. 201910251620.5 filed with the CNIPA on Mar. 29, 2019. The disclosures of these priority applications are incorporated herein by reference in their entireties.

TECHNICAL FIELD

The present application relates to radio communication networks, for example, a transmission method and apparatus, a device, a system and a storage medium.

BACKGROUND

Resources are configured, scheduled and transmitted based on bandwidth parts (BWPs) in New Radio (NR) technologies. Various channels are configured or scheduled within a BWP, and then transmission is performed by using the configured or scheduled channels.

When the bandwidth of a BWP is large, the transmission success rate may be affected during configuration, scheduling and transmission. For example, a base station or user equipment (UE) performs a clear channel assessment (CCA) in units of 20 MHz. However, if the bandwidth of the BWP is larger than 20 MHz, a CCA result has a great impact on configuration, scheduling and transmission using the BWP.

SUMMARY

The present application provides a transmission method and apparatus, a device, a system and a storage medium.

An embodiment of the present application provides a transmission method. The method includes steps described below.

To-be-transmitted information is allocated to one or more resource subsets of a target transmission resource, where the target transmission resource is divided into a plurality of resource subsets.

Corresponding to-be-transmitted information is transmitted on the allocated at least one resource subset.

An embodiment of the present application provides a transmission method. The method includes steps described below.

Indication information indicating that to-be-transmitted information is allocated to one or more resource subsets of a target transmission resource is received, where the target transmission resource is divided into a plurality of resource subsets.

The to-be-transmitted information is transmitted on the at least one resource subset corresponding to the indication information.

An embodiment of the present application provides a transmission apparatus. The transmission apparatus includes an allocation module and a first transmission module.

The allocation module is configured to allocate to-be-transmitted information to one or more resource subsets of a target transmission resource, where the target transmission resource is divided into a plurality of resource subsets.

The first transmission module is configured to transmit corresponding to-be-transmitted information on the one or more resource subsets allocated.

An embodiment of the present application provides a transmission apparatus. The transmission apparatus includes a reception module and a second transmission module.

The reception module is configured to receive indication information indicating that to-be-transmitted information is allocated to one or more resource subsets of a target transmission resource, where the target transmission resource is divided into a plurality of resource subsets.

The second transmission module is configured to transmit the to-be-transmitted information on the one or more resource subsets corresponding to the indication information.

An embodiment of the present application provides a user equipment. The user equipment includes at least one processor and at least one memory.

The at least one memory is coupled to the at least one processor and is configured to store instructions for executing the method applied to the user equipment of the embodiment of the present application.

An embodiment of the present application provides a network device. The network device includes at least one processor and at least one memory.

The at least one memory is coupled to the at least one processor and is configured to store instructions for executing the method applied to the network equipment of the embodiment of the present application.

An embodiment of the present application provides a communication system including the network device of the embodiment of the present application and the user equipment of the embodiment of the present application.

An embodiment of the present application provides a storage medium. The storage medium is configured to store a computer program which, when executed by a processor, implements any one of the methods of the embodiments of the present application.

According to the embodiments of the present application, the to-be-transmitted information is allocated to a resource subset of the target transmission resource, which is conducive to improving the transmission success rate.

DETAILED DESCRIPTION

Embodiments of the present application are described hereinafter in detail in conjunction with the drawings.

Figure 1:
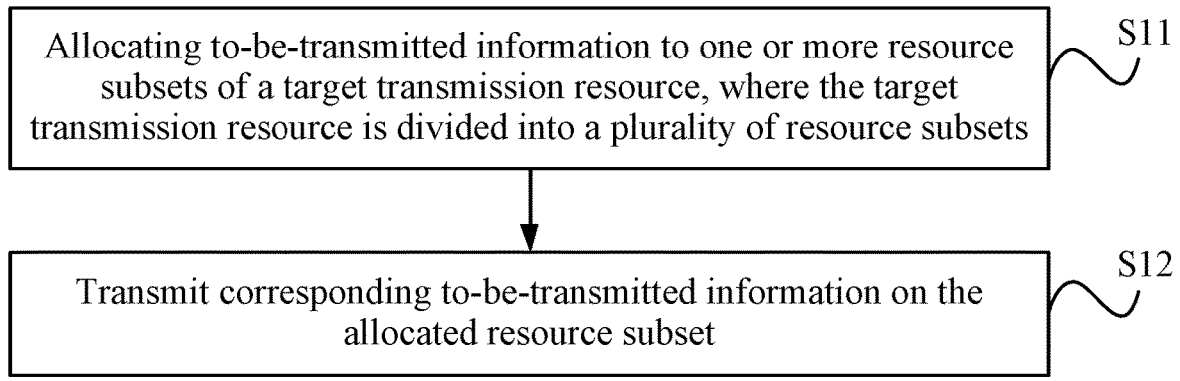
FIG. 1 is a flowchart of a transmission method according to an embodiment of the present invention.

FIG. 1 is a flowchart of a transmission method according to an embodiment of the present invention. As shown in FIG. 1, the method may include the steps described below.

In step S11, to-be-transmitted information is allocated to one or more resource subsets of a target transmission resource, where the target transmission resource is divided into a plurality of resource subsets.

In step S12, corresponding to-be-transmitted information is transmitted on the allocated at least one resource subset.

In the embodiment of the present application, the target transmission resource may be a BWP (bandwidth part). The BWP may be divided into a plurality of resource subsets in advance, and a resource subset of the BWP may be referred to as a sub-band. The bandwidth of the sub-band may be defined to be less than a certain bandwidth value. For example, a base station or UE typically performs a clear channel assessment (CCA) in units of 20 MHz, and the bandwidth of each sub-band may be defined to be less than 20 MHz.

In an example implementation, the step S12 may include steps described below. Channel access is performed on the allocated at least one resource subset.

The corresponding to-be-transmitted information is transmitted on a resource subset on which the channel access is successful.

For example, in some countries and regions, corresponding regulatory policies exist for the use of unlicensed spectrum. For example, a device performs Listen Before Talk (LBT) before transmitting data using an unlicensed carrier. The LBT is also referred to as the clear channel assessment (CCA). A device with a successful clear channel assessment can transmit data on unlicensed resources. Therefore, the clear channel assessments may be performed on allocated resource subsets. The corresponding to-be-transmitted information is transmitted on a resource subset on which a clear channel assessment is successful. Transmission can be discarded on a resource subset on which a clear channel assessment fails.

In an example implementation, the to-be-transmitted information includes a plurality of types, and different types of information correspond to different allocation methods. Examples are described below.

Example one: The to-be-transmitted information includes data information. For example, the to-be-transmitted information includes a physical downlink shared channel (PDSCH) or a physical uplink shared channel (PUSCH). The to-be-transmitted information is allocated to one or more resource subsets of the target transmission resource by using at least one of the included methods described below.

Method one: A plurality of data channels are scheduled at a same occasion for a same user equipment and a same target transmission resource, where different data channels are allocated to different resource subsets of the same target transmission resource for transmission. For example, the base station schedules a plurality of PDSCHs/PUSCHs at the same occasion for the same UE and the same BWP, and each PDSCH/PUSCH is located in a different sub-band (such as 20 MHz). The base station then transmits the final number of PDSCHs/PUSCHs merely on the sub-band on which the CCA is successful according to the CCA result.

Method two: One data channel is scheduled at a same occasion for a same user equipment and a same target transmission resource, where each code block group included in the one data channel is allocated to a different resource subset of the target transmission resource for transmission. For example, the base station schedules merely one PDSCH/PUSCH at the same occasion for the same UE and the same BWP, and each code block group (CBG) included in the PDSCH/PUSCH is transmitted on a different sub-band.

Method three: A same transport block is scheduled to a plurality of data channels, where the plurality of data channels are respectively used for transmitting different redundancy versions of the same transport block, and different data channels are allocated to different resource subsets of the target transmission resource for transmission.

For example, the base station schedules the same transport block (TB) to different sub-bands or frequency domain positions. That is, the base station schedules the same TB to be transmitted through different PDSCHs/PUSCHs, and the plurality of PDSCHs/PUSCHs may transmit different redundancy versions of the TB.

Method four: A frequency domain position of one data channel is scheduled onto two or more resource subsets for a same user equipment, where the one data channel is allowed to be transmitted in a case where clear channel assessments of the two or more resource subsets are both successful.

For example, the base station schedules the frequency domain position of one PDSCH/PUSCH of the UE to two sub-bands. The PDSCH/PUSCH is transmitted only when CCAs are successfully performed on both of the two sub-bands. If a CCA performed on one sub-band fails, transmission of the PDSCH/PUSCH is discarded.

After scheduling, the base station performs the CCAs on a plurality of scheduled sub-bands, transmits the PDSCH/PUSCH scheduled on a sub-band if the CCA performed on the sub-band is successful, and discards transmission of the PDSCH/PUSCH scheduled on a sub-band if the CCA performed on the sub-band fails.

In an example implementation, when a channel access contention time window adjustment is performed, a non-acknowledge (NACK) proportion of demodulation of a code block group or a transport block corresponding to a resource subset on which a clear channel assessment fails is not counted. For example, for a sub-band on which the CCA fails, when contention window adjustment is performed for the next channel access, the non-acknowledge (NACK) proportion of demodulation of a CBG or TB corresponding to the sub-band is not counted.

Example two: The to-be-transmitted information includes control information. For example, the control information includes a physical downlink control channel (PDCCH) or a physical uplink control channel (PUCCH). The to-be-transmitted information is allocated to one or more resource subsets of the target transmission resource by using at least one of the included methods described below.

Method one: A plurality of control resource sets (CORESETs) are configured for the target transmission resource, where each CORESET is limited in one resource subset for configuration. For example, the CORESET is limited in one sub-band (20 MHz) for configuration. The frequency domain position of the PDCCH and the like can be determined by the frequency domain resource configuration of the CORESTET.

Method two: The to-be-transmitted PDCCH is limited in one resource subset.

The method two in which the to-be-transmitted PDCCH is limited in one resource subset includes at least one of the following.

(1) The PDCCH is configured, through radio resource control (RRC) signaling or a physical broadcast channel (PBCH), to use non-interleaved resource mapping. For example, a use of the non-interleaved resource mapping mode by the PDCCH is configured in RRC higher-layer signaling or in the PBCH. In addition, if the sub-carrier spacing (SCS) of the PDCCH is configured to be 30 kHz, the highest aggregation level of the PDCCH may be configured to be 8 control channel elements (CCEs). In this manner, the frequency domain position at which the PDCCH is finally transmitted does not exceed 20 M. For SCS of 60 kHz, the PDCCH may be configured with a highest aggregation level of four CCEs.

(2) A bundling mechanism of a resource element group (REG) is modified so that a bandwidth of a control channel element (CCE) of the PDCCH mapped to the REG is less than a size of the one resource subset. For example, the bandwidth of a frequency domain resource of the CCE mapped to the REG is made less than 20 M.

(3) A hashing process of search space is limited in the one resource subset. For example, the hashing process is limited in one sub-band.

Method three: A plurality of physical uplink control channels (PUCCHs) are allocated to different resource subsets of the target transmission resource for a same user equipment, where each PUCCH is located in one interleaved element and/or part of interleaved elements in one resource subset.

For example, the base station may allocate a plurality of PUCCH resources in different sub-bands for the same UE, and each PUCCH is located in one interleaved element and/or part of interleaved elements within one sub-band.

In addition, PUCCHs of different UEs can be multiplexed through different interleaved elements or different orthogonal codes on the same interleaved element. For example, when the number of bits of uplink control information (UCI) carried by PUCCH format2 and PUCCH format3 is less than or equal to 2, the UCI information is increased to have at least three bits in a manner of repetition or filling 0.

In an example implementation, downlink control information carried by the PUCCH and the like includes at least one of the following:

(1) a length of remaining maximum channel occupy time (MCOT), for example, including the number of slots and the number of symbols of the last slot or including merely the number of remaining slots;

(2) an index of a resource subset for transmission in the target transmission resource, for example, an index of a sub-band for data transmission in one BWP by the base station; or (3) an indication triggering two-step transmission of a PUSCH.

The sub-band for transmitting downlink control information may be indicated by different PDCCH demodulation reference signal (DMRS) sequences or downlink control information (DCI). For example, carrying is performed by using NR DCI format 2_0; downlink control information may also be carried and the preceding functions may be implemented by using a new DCI format. Moreover, the detection period or granularity of the PDCCH corresponding to DCI may be dynamically switched. The detection granularity before the start of channel occupy time (COT) and the detection granularity of the first slot after the start of COT are smaller than the detection granularity of the remaining slot of COT.

In an example implementation, allocating to-be-transmitted information to one or more resource subsets of a target transmission resource further includes at least one of the following.

(1) An interleaved element index is indicated, and all resource blocks (RBs) of one resource subset of one interleaved element are allocated to a PUCCH. For example, all RBs included in one sub-band of a certain interleaved element are allocated to the PUCCH.

(2) A resource subset index is indicated, and information about an offset of a starting RB of a PUCCH in a resource subset relative to a first RB in the resource subset is indicated. For example, a sub-band index is provided first and then a value of an offset of a starting RB of a PUCCH in the sub-band relative to the first RB in the sub-band is provided.

(3) An interleaved element index is indicated, and indexes and the number of starting RBs included within at least one interleaved element are allocated to a PUSCH. For example, the interleaved element index is indicated by means of bitmap or the serial number of the interleaved element is directly indicated. Indexes and the number of starting RBs are then indicated by means of resource indication value (RIV).

(4) An interleaved element index is indicated, and the number of RBs, offset information of a RB of a PUSCH in a resource subset and an index of a resource subset where the PUSCH is located in at least one interleaved resource are indicated. For example, the interleaved element index is indicated by means of bitmap or the serial number of the interleaved element is directly indicated. Then, a sub-band index is provided and a value of an offset of the first RB of a PUSCH in the sub-band relative to the first RB in the sub-band is provided.

If a BWP is not divided into a plurality of sub-bands, for the resource configuration of the PDCCH/PUSCH/PDSCH/PUCCH, a BWP index is typically indicated first and then configuration is performed in the BWP. In the embodiment of the present application, the sub-band index can be indicated after the BWP is divided into a plurality of sub-bands. In addition, in the embodiment of the present application, when resource allocation of the PUSCH is performed based on interleaving, the interleaved element index may also be indicated and partial interleaved allocation is allowed.

According to the embodiments of the present application, the to-be-transmitted information is allocated to a resource subset of the target transmission resource, which is conducive to improving the transmission success rate. For example, the bandwidth of the sub-band of the BWP is defined to be less than 20 MHz. If a CCA fails, merely transmission of the part of the channel on the sub-band where the CCA fails is discarded, and the channel can continue to be transmitted on the sub-band where the CCA is successful, which is conducive to reducing the impact of CCA failure on channel transmission and improves the transmission success rate.

Figure 2:
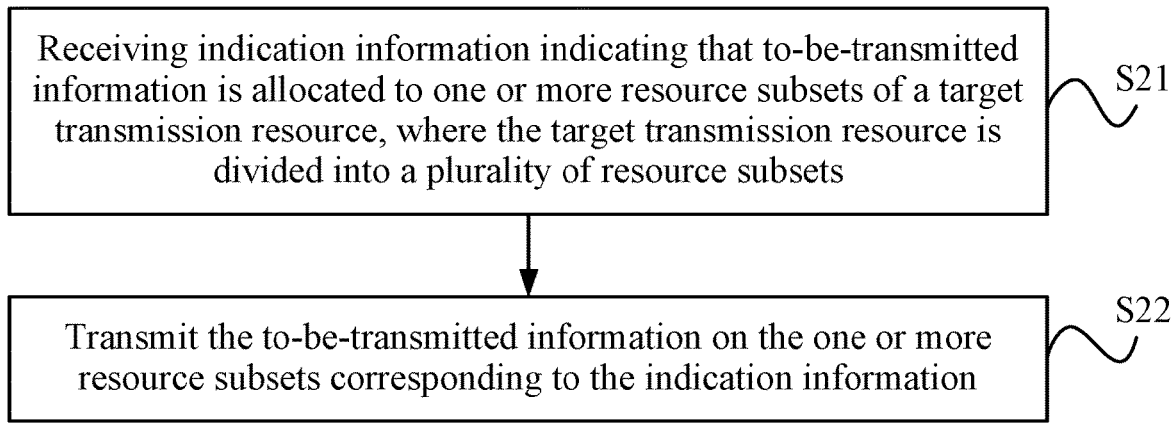
FIG. 2 is a flowchart of a transmission method according to another embodiment of the present invention.

FIG. 2 is a flowchart of a transmission method according to an embodiment of the present invention. As shown in FIG. 2, the method may include the steps described below.

In step S21, indication information indicating that to-be-transmitted information is allocated to one or more resource subsets of a target transmission resource is received, where the target transmission resource is divided into a plurality of resource subsets.

In step S22, the to-be-transmitted information is transmitted on the one or more resource subsets corresponding to the indication information.

In the embodiment of the present application, the target transmission resource may be a BWP. The BWP may be divided into a plurality of resource subsets in advance, and a resource subset of the BWP may be referred to as a sub-band. The bandwidth of the sub-band may be defined to be less than a certain bandwidth value. For example, the bandwidth of each sub-band is defined to be less than 20 MHz.

In an example implementation, transmitting the to-be-transmitted information on the one or more resource subsets corresponding to the indication information includes: performing channel access on the one or more resource subsets corresponding to the indication information; and transmitting corresponding to-be-transmitted information on a resource subset on which the channel access is successful. For example, the UE may perform a CCA after receiving the indication information of a sub-band of a BWP allocated by the base station to a data channel or a control channel. The corresponding channel is transmitted on a sub-band where a CCA is successful. Transmission can be discarded on a sub-band where a CCA fails.

In an example implementation, the to-be-transmitted information includes data information such as a PDSCH or PUSCH. The indication information may include at least one piece of the following scheduling information:

scheduling information about scheduling a plurality of data channels at a same occasion for a same user equipment and a same target transmission resource, where different data channels are allocated to different resource subsets of the same target transmission resource for transmission;

scheduling information about scheduling one data channel at a same occasion for a same user equipment and a same target transmission resource, where each code block group included in the one data channel is allocated to a different resource subset of the target transmission resource for transmission;

scheduling information about scheduling a same transport block to a plurality of data channels, where the plurality of data channels are respectively used for transmitting different redundancy versions of the same transport block, and different data channels are allocated to different resource subsets of the target transmission resource for transmission; or scheduling information about scheduling a frequency domain position of one data channel onto two or more resource subsets for a same user equipment, where the one data channel is allowed to be transmitted in a case where clear channel assessments of the two or more resource subsets are both successful.

In an example implementation, the to-be-transmitted information includes control information such as a PDCCH or PUCCH. The indication information includes at least one piece of the following configuration information:

configuration information about configuring a plurality of control resource sets (CORESETs) for the target transmission resource, where each CORESET is limited in one resource subset for configuration;

configuration information about limiting a to-be-transmitted PDCCH in one resource subset; or configuration information about allocating a plurality of physical uplink control channels (PUCCHs) to different resource subsets of the target transmission resource for a same user equipment, where each PUCCH is located in one interleaved element and/or part of interleaved elements in one resource subset.

In an example implementation, the indication information includes at least one piece of the following downlink control information: a length of remaining MCOT; an index of a resource subset for transmission in the target transmission resource; or an indication triggering two-step transmission of a PUSCH.

In an example implementation, the indication information further includes at least one piece of the following resource allocation information: an interleaved element index and all RBs of one resource subset of an interleaved element allocated to a PUCCH; an interleaved element index and indexes and the number of starting RBs included within at least one interleaved element allocated to a PUSCH; or an interleaved element index and the number of RBs, offset information of a RB of a PUSCH in a resource subset and an index of a resource subset where the PUSCH is located in at least one interleaved resource.

Taking the BWP as the target transmission resource as an example, the processes of configuring, scheduling, and transmitting uplink and downlink resources for different types of channels are described separately.

First type of channel: PDSCH

A BWP is divided into a plurality of sub-bands, and the scheduling and transmission methods of a downlink PDSCH in the BWP include at least one of the methods described below.

Method one: The base station schedules a plurality of PDSCHs at the same occasion for the same UE and the same BWP. The plurality of PDSCHs are located in different sub-bands. The base station then transmits the final number of PDSCHs merely on the sub-band on which the CCA is successful according to the CCA result.

Figure 3:
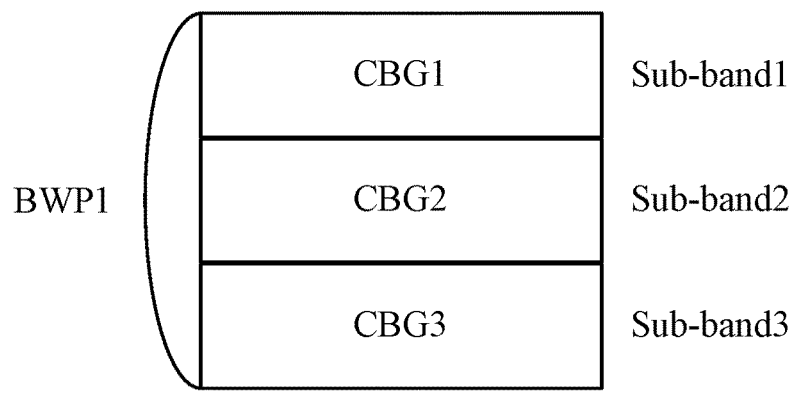
FIG. 3 is a schematic diagram showing transmission of code block groups (CBGs) on different sub-bands in a transmission method according to another embodiment of the present invention.

Method two: The base station schedules merely one PDSCH at the same occasion for the same UE and the same BWP, and each CBG included in the PDSCH is transmitted on a different sub-band. As shown in FIG. 3, When a CCA performed on a sub-band for corresponding PDSCH transmission fails, the to-be-transmitted CBG on the sub-band is punctured. The base station then schedules through CBG retransmission the CBG on the sub-band where the CCA fails.

Further, the base station limits different CBGs corresponding to the same PDSCH to all sub-bands through one of the options described below.

Option 1: The original mapping frequency domain first is modified to time domain first.

Option 2: A resource allocation method is modified. Resources are allocated based on CBGs, and each CBG is limited in one sub-band. RBs in each sub-band are allocated by using partial interleaving.

Further, for a sub-band on which the CCA fails, when contention window adjustment is performed for the next channel access, the NACK proportion of demodulation of a CBG or TB corresponding to the sub-band is not counted.

Method three: The base station schedules the same TB to different sub-bands or frequency domain positions. That is, the base station schedules the same TB to be transmitted through different PDSCHs, and the plurality of PDSCHs may transmit different redundancy versions of the TB.

Second type of channel: PDCCH

Assuming that one BWP includes at least two sub-bands of 20 MHz, the configuration and transmission methods of the PDCCH includes at least one of the methods described below. Method one: Each CORESET is limited in one sub-band (20 MHz) for configuration. For a BWP larger than 60 MHz, the number of CORESETs configured within one BWP is increased to 4 or more.

Figure 4:
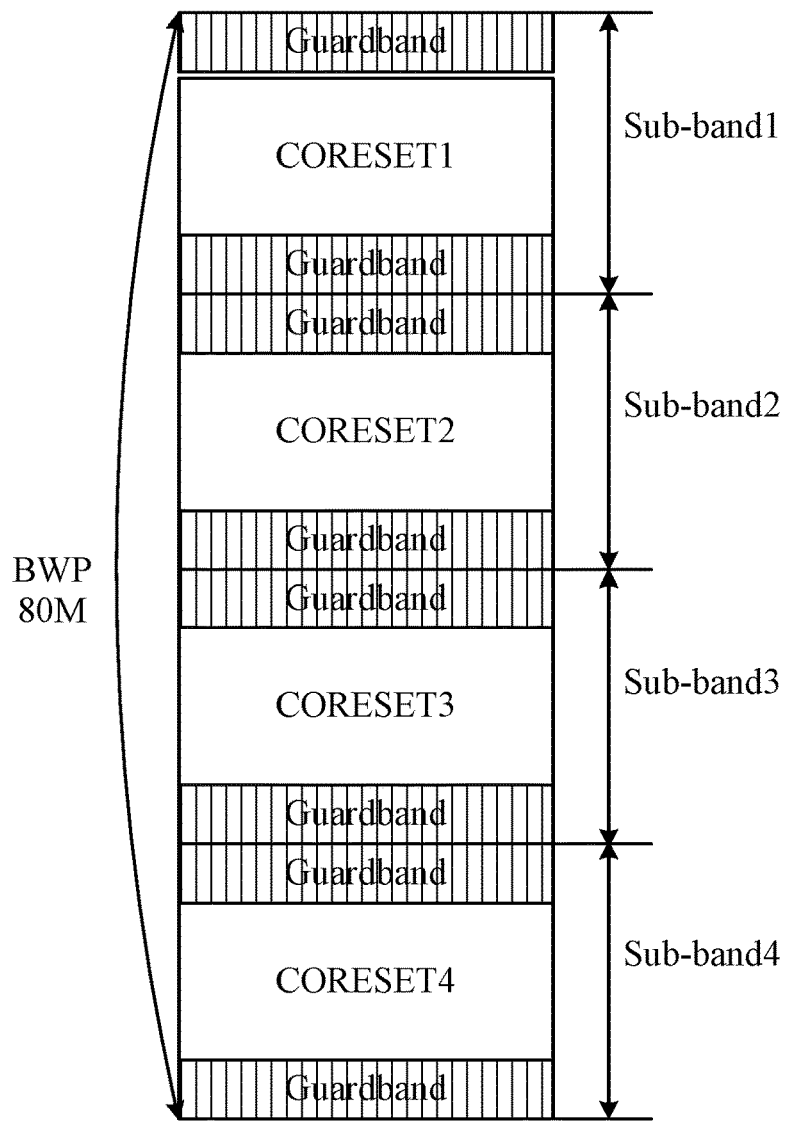
FIG. 4 is a schematic diagram showing frequency domain positions of CORESETs in a transmission method according to another embodiment of the present invention.

Further, the guardband configured between sub-bands is to be considered for the resource configuration of the CORESET. For a BWP of 80 M, the frequency domain position of the CORESET can be as shown in FIG. 4.

Method two: Each to-be-transmitted PDCCH is limited in one sub-band in specifically one of the included manners described below.

Manner one: A use of the non-interleaved resource mapping mode by the PDCCH is configured in higher-layer signaling.

For SCS of 15 kHz, one PDCCH has a maximum of 16 CCEs and a maximum bandwidth of 16*6 RB=16 M which is no more than 20 M.

For SCS of 30 kHz, it is also necessary to limit the highest aggregation level of one PDCCH to 8 CCEs, so as not to exceed 20 M.

For SCS of 60 kHz, it is also necessary to limit the highest aggregation level of one PDCCH to 4 CCEs, so as not to exceed 20 M.

For the interleaved resource mapping mode, one PDCCH is limited in one sub-band for transmission in manner two or manner three described below.

Manner two: The REG bundling mechanism is modified.

Manner three: A hashing process of search space is limited in one sub-band.

Third type of channel: PUSCH Assuming that one BWP includes at least two sub-bands of 20 MHz, the resource configuration, scheduling and transmission methods of the PUSCH includes at least one of the methods described below.

Method one: The base station schedules a plurality of PUSCHs at the same occasion for the same UE and the same BWP, and each PUSCH is limited in one sub-band for transmission. The UE then transmits the final PUSCH on the sub-band on which the CCA is successful according to the CCA result.

Figure 5A:
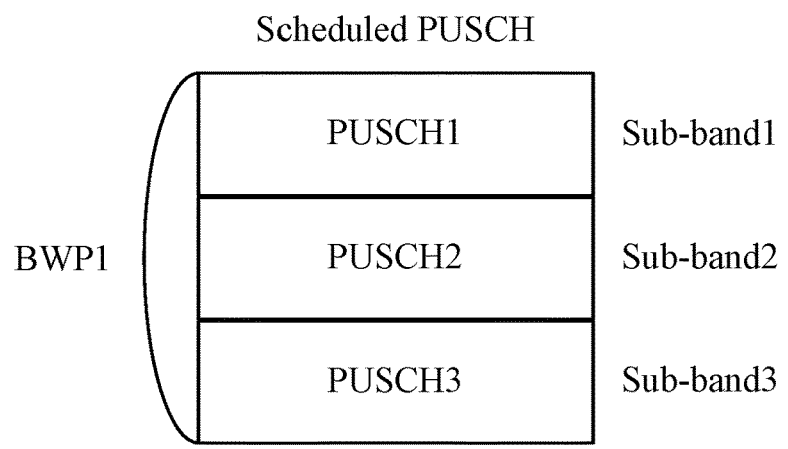
FIGS. 5A and 5B are schematic diagrams of physical uplink shared channel (PUSCH) scheduling and transmission in a transmission method according to another embodiment of the present invention.
Figure 5B:
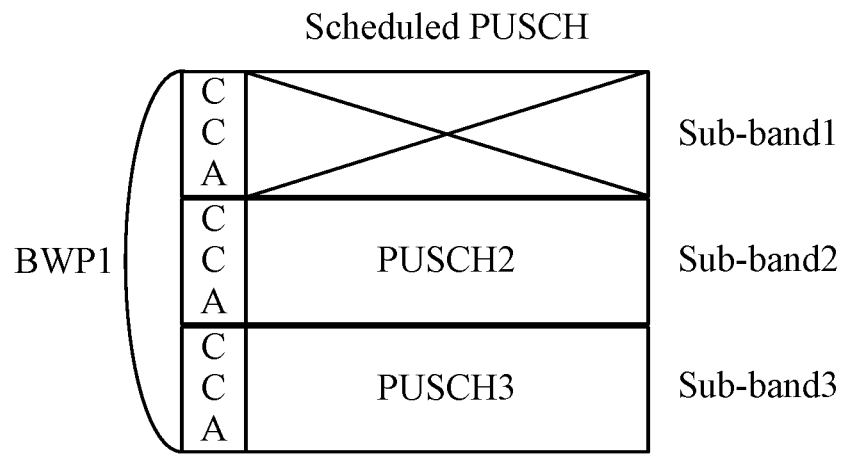

As shown in FIGS. 5A and 5B, the base station schedules three PUSCHs on three sub-bands of BWP1, respectively. The UE performs CCAs on the three sub-bands, respectively. The CCA performed on sub-band1 fails, and the CCAs on sub-band2 and sub-band3 are successful, so the UE transmits PUSCH2 and PUSCH3.

Further, the plurality of PUSCHs can transmit different redundancy versions (RVs) of the same TB, or each PUSCH can transmit a different TB.

Method two: The base station schedules merely one PUSCH at the same occasion for the same UE and the same BWP, and each CBG included in the PUSCH is transmitted on a different sub-band. The UE transmits the CBGs included in the final PUSCH based on the result of the CCAs performed on the sub-bands by the UE itself. For a CBG that fails to be transmitted, the base station schedules the retransmission of the CBG next time. The process is similar to that of the PDSCH.

Then, based on the front loaded demodulation reference signal (DMRS) transmitted by the UE, the base station detects the sub-band on which the UE transmits the PUSCH.

Further, the resource allocation of the PUSCH includes partial interleaving allocation, and the specific method is one of the manners described below.

Manner one: The interleaved elements are numbered according to one BWP. First, an interleaved element index is indicated, for example, by means of bitmap. Indexes and the number of starting RBs included in the interleaved element are then indicated by means of RIV.

Further, the pattern of the interleaved element may be predefined, and each interleaved element includes N discrete RBs at equal intervals.

Manner two: Resource allocation is indicated at two levels. The interleaved index is indicated in the first level, and the index of the sub-band where the PUSCH is located in the interleaved element and the offset value and the number of starting RBs in the sub-band are indicated in the second level.

Fourth type of channel: PUCCH Assuming that one BWP includes at least two sub-bands of 20 MHz, the resource configuration and transmission methods of the PUCCH include: the base station allocates a plurality of PUCCH resources in different sub-bands for the same UE. The PUCCH is located in one interleaved element and/or part of interleaved elements within one sub-band.

In one example, the resource allocation method may include indicating an interleaved element index.

For example, the interleaved element index is indicated by means of bitmap or the serial number of the interleaved element is directly indicated. Then, the sub-band index and the offset value of the starting RB in the sub-band are provided. In this manner, the resource position of the PUCCH can be determined.

Further, a plurality of UEs are supported to transmit PUCCH format2 or PUCCH format3 on the same interleaved element through a time domain or frequency domain orthogonal cover code (OCC).

Further, transmitting the PUCCH format2 may include mapping to a plurality of discrete RBs at equal intervals within 20 MHz, where different UEs perform the frequency domain OCC at the granularity of RBs, and the OCC includes a Walsh sequence or discrete Fourier transform (DFT) sequence.

Further, transmitting the PUCCH format3 may include: mapping to a plurality of discrete RBs at equal intervals within 20 MHz, and performing a time domain orthogonal cover code (OCC) of a pre-DFT before the discrete Fourier transform (DFT), where the OCC is performed separately in units of RBs.

In addition, when the number of bits of UCI carried by PUCCH format2 and PUCCH format3 is less than or equal to 2, the UCI information may be increased to have at least three bits in a manner of repetition or filling 0.

In another embodiment, the base station can transmit some downlink control signaling to the UE after the CCA is successful.

After the CCA is successful, the base station can transmit downlink control information indicating the time-frequency structure of COT to assist the UE in receiving downlink data. The downlink control information may be UE-group common (UE-GC) or UE-specific.

In one example, the downlink control information may indicate at least one of information one, information two or information three.

Information one: A length of remaining MCOT The remaining length includes the number of slots and the number of symbols of the last slot or indicates merely the number of remaining slots; and corresponding SCS is reference SCS or SCS which is the same as that of DCI. Such information is used for determining by the UE whether to perform switching of clear channel detection of Category 1 (Cat1) or Category 2 (Cat2).

Information two: An index of a sub-band for data transmission in one BWP The specific indication method includes the two types described below.

(1) The sub-band for data transmission is indicated by using a DMRS. The DMRS includes a wideband DMRS and a narrowband DMRS. Different DMRSs indicate different occupied sub-bands.

(2) The sub-band for transmission from the base station is indicated through a bit field in DCI signaling.

Further, the DCI may be transmitted on one sub-band or each sub-band for the data transmission. Information three: Information triggering two-step transmission of a PUSCH After GC-DCI is received within the time window indicated by the first uplink scheduling grant (UL grant), the scheduled PUSCH can be transmitted. The timing relationship is configured relative to the size of the number of slots and/or number of symbols corresponding to the DCI. Further, the preceding information is carried by NR DCI format 2_0, and a new DCI format may also be defined to implement the preceding functions and carry the preceding information. Moreover, the detection period or granularity of the PDCCH corresponding to DCI is dynamically switched. The detection granularity before the start of COT and the detection granularity of the first slot after the start of COT are smaller than the detection granularity of the remaining slot of COT.

Further, the information is transmitted multiple times within COT, and each time the specific information can be changed.

According to the transmission method of the embodiment of the present application, the influence on the transmission and reception of the uplink and downlink control channels can be reduced in the case where the CCAs on part of sub-bands of the large bandwidth fail. In addition, in the case of CCA failure, the uplink and downlink traffic channels may also be scheduled and transmitted. In addition, resource allocation schemes of the PUSCH and the PUCCH can be used to meet some requirements of unlicensed control.

Application Example One

The application example mainly includes a transmission method of a downlink data channel on a base station side.

Assuming that the bandwidth of a downlink BWP is 80 MHz, the process in which the base station performs transmission on the BWP is as follows: the base station performs the CCAs on four sub-bands in units of 20 MHz and then selects the sub-band on which the CCA is successful to transmit a control channel or a data channel.

The method for transmitting the control channel includes at least one of the methods described below.

Method one: The BWP is configured with four CORESETs, and each CORESET is limited in one sub-band (20 MHz) for configuration.

Method two: Each PDCCH is limited in one sub-band for transmission in specifically one of the included manners described below.

Manner one: A use of the non-interleaved resource mapping mode by the PDCCH is configured in RRC higher-layer signaling or in a PBCH. If the SCS of the PDCCH is set to be 30 kHz, the highest aggregation level of the PDCCH is configured to be 8 CCEs. In this manner, the frequency domain position at which the PDCCH is finally transmitted does not exceed 20 M. For SCS of 60 kHz, the highest aggregation level of the PDCCH is limited to 4 CCEs so that the frequency domain position at which the PDCCH is finally transmitted does not exceed 20 M.

The PDCCH is configured to adopt an interleaved resource mapping mode or a non-interleaved resource mapping mode through the RRC higher-layer signaling or PBCH, the SCS is configured to 30 kHz or 60 kHz and the highest aggregation level is supported to be 16 CCEs. Then, the base station can limit one PDCCH to be transmitted in one sub-band in manner two or manner three described below.

Manner two: The REG bundling mechanism is modified. The bandwidth of a frequency domain resource of the CCE mapped to the REG is less than 20 M.

Manner three: A hashing process of search space is limited in one sub-band.

With the method, the bandwidth of the PDCCH transmitted by the base station can be ensured to be within 20 MHz, thereby avoiding the allocation of the PDCCH to two or more sub-bands for transmission, thereby reducing the influence of CCA failure on the transmission of the control channel.

Application Example Two

The application example mainly includes a transmission method of a downlink traffic channel (PDSCH) under large bandwidth.

Assuming that a certain UE is configured with three uplink (UL) BWPs, and an activated uplink BWP is 60 MHz or the bandwidth of one of the two or three activated BWPs is 60 MHz, the base station can schedule and transmit the PDSCH of the UE by using one of the methods described below.

Method one: The base station schedules a plurality of PDSCHs at the same occasion for the same BWP of the same UE. For example, the base station prepares to schedule three PDSCHs for UE1 at moment n, and each PDSCH is located in a different sub-band of 20 MHz.

The base station then transmits the final number of PDSCHs merely on the sub-band on which the CCA is successful according to the CCA result. For example, PDSCH1 is located on sub-band1, PDSCH2 is located on sub-band1, and PDSCH1 is located on sub-band1. If the base station successfully performs CCAs on sub-band1 and sub-band3, the base station merely transmits PDSCH1 and PDSCH3 and discards the transmission of PDSCH2.

Method two: The base station schedules merely one PDSCH at the same occasion for the same BWP of the same UE. Each CBG included in the PDSCH is transmitted on a different sub-band. When a CCA performed on a sub-band for corresponding PDSCH transmission fails, the to-be-transmitted CBG on the sub-band is punctured. The base station then schedules through CBG retransmission the CBG on the sub-band where the CCA fails.

Further, the base station limits different CBGs corresponding to the same PDSCH to all sub-bands through one of the options described below.

Option 1: The original mapping frequency domain first is modified to time domain first.

Figure 6A:
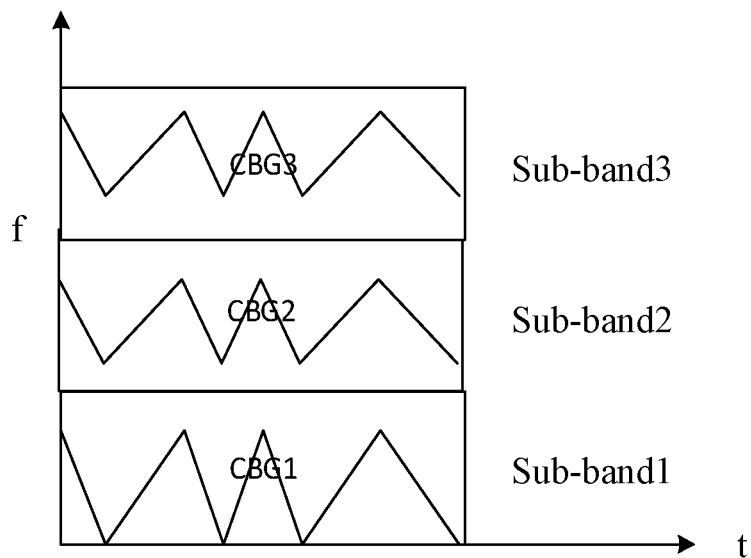
FIGS. 6A and 6B are schematic diagrams of resource allocation based on CBGs in a transmission method according to another embodiment of the present invention.
Figure 6B:
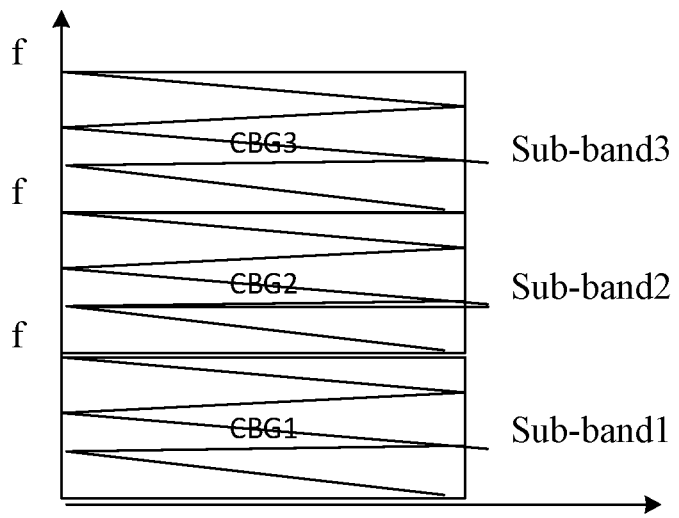

Option 2: A resource allocation method is modified. For example, resources are allocated based on CBGs, and each CBG is limited in one sub-band, as shown in FIGS. 6A and 6B.

For the punctured CBG, when contention window adjustment is performed for the next channel access, the NACK proportion of demodulation of the CBG corresponding to the sub-band may not be counted.

Method three: The base station schedules the same TB to different sub-bands or frequency domain positions. That is, the base station schedules the same TB to be transmitted through different PDSCHs, and the plurality of PDSCHs may transmit different redundancy versions of the TB. The base station then performs CCAs on the plurality of scheduled sub-bands. The base station transmits the PDSCH scheduled on a sub-band if the CCA performed on the sub-band is successful and discards transmission of the PDSCH scheduled on a sub-band if the CCA performed on the sub-band fails.

On the UE side, the UE can receive the scheduled PDSCH and/or the corresponding CBG at the corresponding frequency domain position according to the downlink control signaling, or the UE can receive the scheduled PDSCH at the corresponding sub-band according to the indication information of the sub-band for data transmission transmitted by the base station. With the preceding method, the base station can also transmit the PDSCH in the case where CCAs on some sub-bands fail, thus reducing the influence of the CCA performed on PDSCH transmission.

Application Example Three

The application example mainly includes scheduling and transmission methods of an uplink traffic channel (PUSCH) under large bandwidth.

Assuming that a base station configures three uplink (UL) BWPs for a certain UE, and an activated uplink BWP is 40 MHz or the bandwidth of one of the two or three activated BWPs is 40 MHz, the base station schedules the UE to transmit the PUSCH by using one of the methods described below.

Method one: The base station schedules a plurality of PUSCHs at the same occasion for the same UE and the same BWP, and each PUSCH is limited in one sub-band for transmission. The UE then transmits the final PUSCH on the sub-band on which the CCA is successful according to the CCA result.

Further, the plurality of PUSCHs can transmit different RVs of the same TB, or each PUSCH can transmit one TB.

Method two: The base station schedules merely one PUSCH for transmission at the same occasion for the same UE and the same BWP, and each CBG included in the PUSCH is transmitted on a different sub-band. The UE transmits the CBGs included in the final PUSCH based on the result of the CCAs performed on the sub-bands by the UE itself. If the CBG fails to be transmitted, the UE eliminates the CBG from the PUSCH by puncturing the CBG. The base station then schedules retransmission of the CBG next time.

Further, resources of the PUSCH are allocated in one of the included manners described below. The interleaved elements are numbered according to one BWP. The frequency domain resources of the PUSCH of a certain UE are indicated in the included manners described below.

Manner one: An interleaved element index is indicated. For example, the interleaved element index is indicated by means of bitmap or the serial number of the interleaved element is directly indicated. Indexes and the number of starting RBs included in the interleaved element are then indicated by means of RIV.

Manner two: Resource allocation is indicated at two levels. The interleaved index is indicated in the first level; and the index of the sub-band where the PUSCH is located in the interleaved element, the value of the offset of the first RB of the PUSCH relative to the first RB in the sub-band, and the number of RBs in the sub-band are indicated in the second level.

Further, the pattern of the interleaved element may be predefined, and each interleaved element includes N discrete RBs at equal intervals.

Method three: The frequency domain position of a PUSCH of the UE is scheduled to be on two sub-bands. The PUSCH is transmitted by the UE only when CCAs are successfully performed on both of the two sub-bands by the UE. If a CCA performed on one sub-band fails, transmission of the PUSCH is discarded by the UE.

Then, based on the front loaded DMRS transmitted by the UE, the base station detects the sub-band on which the UE transmits the PUSCH and performs data demodulation.

With the preceding method of the application example, the UE can transmit the PUSCH in the case where CCAs on some sub-bands fail, thus reducing the influence of the CCA performed on PUSCH transmission. It is to be noted that the transmission method of the PUSCH described above can also be used in the case of license-free configuration transmission. In addition, the UE can notify the sub-band for PUSCH transmission to the base station through the uplink control information and can also determine the sub-band for uplink transmission in the manner in which the base station detects the front loaded DMRS.

Application Example Four

The application example mainly includes the configuration and transmission methods of the PUCCH under large bandwidth.

Figure 7:
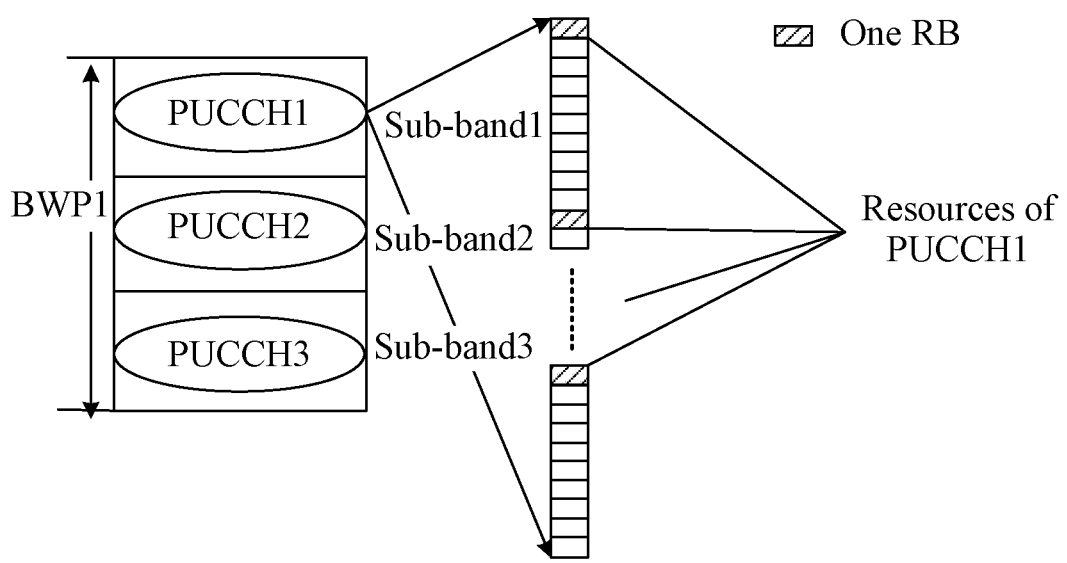
FIG. 7 is a schematic diagram of PDCCH resource allocation in a transmission method according to another embodiment of the present invention.

It is assumed that the base station configures four UL BWPs for a certain UE. An activated uplink BWP is 60 MHz or the bandwidth of one of the two or three activated BWPs is 60 MHz (the BWP includes three sub-bands of 20 MHz), and then the configuration method of the PUCCH resource of the UE may include that the base station allocates one PUCCH resource on each of the three sub-bands for the UE. Each PUCCH is located in one interleaved element and/or part of interleaved elements within one sub-band, as shown in FIG. 7.

Merely one RB exists in PUCCH format0, PUCCH format1 and PUCCH format4 in NR. Although a plurality of RBs can be allocated in format2 and format3, the plurality of RBs are usually continuous and not discrete. This does not meet the regulatory requirement of 80% occupation of unlicensed bandwidth.

The resource allocation method of the PUCCH in the application example includes methods described below.

Method one: An interleaved element index is indicated. For example, the interleaved element index is indicated by means of bitmap or the serial number of the interleaved element is directly indicated. Then, an index of a sub-band where the PUCCH is located in the interleaved element is indicated and an offset of a first RB of a PUCCH in the sub-band relative to a first RB in the sub-band is indicated. All RBs included in one sub-band of a certain interleaved element are allocated to the PUCCH.

Method two: A sub-band index is provided first and then a value of an offset of a starting RB of a PUCCH in the sub-band relative to the first RB in the sub-band is provided.

Further, a plurality of UEs are supported to transmit PUCCH format2 or PUCCH format3 on the same interleaved element through orthogonal cover codes different in time domain or frequency domain.

With the resource allocation method of the application example, on the one hand, the influence that the PUCCH can merely be partially transmitted due to the CCA failure on a certain sub-band can be avoided. On the other hand, the requirement of 80% occupation of unlicensed bandwidth in the sub-band for transmission can be met.

Application Example Five

The application example includes a multiplexing method of one sub-band for the PUCCH by different UEs.

Assuming that the base station allocates different PUCCH resources within one sub-band to a plurality of, for example, 12 UEs, the UEs multiplex the sub-band in one of the manners described below.

Manner one: Different UEs multiplex the sub-band by being allocated with different interleaved elements or RBs, that is, by means of frequency division multiplexing (FDM).

For example, the serial number of the interleaved element allocated to UE1 is 1, the serial number of the interleaved element allocated to UE2 is 3, and the interleaved element is a serial number within the entire BWP or within the sub-band.

Manner two: Different UEs multiplex the same interleaved element or RB of the sub-band by means of time division multiplexing (TDM).

For example, UE1 uses interleaved element 1 in slot 1, UE2 uses interleaved element 1 in slot 2, UE3 uses interleaved element 1 in the first two symbols of slot 3, and UE4 uses interleaved element 1 in the last 12 symbols of slot 3.

Manner three: Different UEs multiplex the same interleaved element at the same occasion by means of code division multiplexing (CDM).

CDM involves a time domain OCC and a frequency domain OCC. For the frequency domain OCC, the granularity of RB can be used as the OCC, and the total number of RBs in the entire sub-band can also be used as the OCC.

Sequences used by the OCC may include a walsh sequence, a DFT sequence, a Zadoff-chu (ZC) sequence, and the like. For example, the PUCCH format3 transmitted by UE1 on interleaved element 2 and over slot 1 is subjected to the OCC in time domain by cyclic shift of 30 of a ZC sequence having a length of 120. The PUCCH format3 transmitted by UE2 on interleaved element 2 and over slot 1 is subjected to the OCC in time domain by cyclic shift of 60 of a ZC sequence having a length of 120. The PUCCH format3 transmitted by UE3 on interleaved element 2 and over slot 1 is subjected to the OCC in time domain by cyclic shift of 90 of a ZC sequence having a length of 120. The PUCCH format3 transmitted by UE4 on interleaved element 2 and over slot 1 is subjected to the OCC in time domain by cyclic shift of 0 of a ZC sequence having a length of 120. Since different cyclic shifts of ZC sequences having the same length are orthogonal, the PUCCHs of the four UEs can multiplex the same time-frequency resources, thereby improving the capacity of the UEs.

In one example, the OCC includes both DMRS and UCI data multiplied by a same orthogonal sequence or the DMRS and UCI data use different orthogonal sequences.

In one example, the base station may notify the UE of the time domain resources, the frequency domain resources and the sequence resources for the OCC through RRC signaling and/or downlink control signaling.

With the method, a plurality of UEs can multiplex the same time-frequency resources in one sub-band through time division, frequency division or different orthogonal codes, thus improving the utilization rate of resources.

Application Example Six

The application example includes some transmission methods of control signaling after a CCA performed by the base station is successful.

After the CCA is successful, the base station transmits downlink control information indicating the time-frequency structure of COT. The downlink control information may be UE-group common or UE-specific.

The downlink control information may indicate at least one of information one, information two or information three.

Information one: A length of remaining MCOT The remaining length includes the number of slots and the number of symbols of the last slot or indicates merely the number of remaining slots; and corresponding SCS is reference SCS or SCS which is the same as that of DCI.

According to the information, the UE can determine whether to perform the switching of CCA between Category1 (Cat1) and Cat2. When the length of the remaining MCOT is indicated non-zero, the UE can execute the CCA mode of Cat2, that is, the CCA mode without random fallback, before performing uplink data transmission. When the length of the remaining MCOT is indicated zero, the UE needs to execute the CCA mode of Cat1, that is, the CCA mode with random fallback, before transmitting uplink data.

Therefore, in the application example, the specific indication manner may include one of the manners described below.

Manner one: The reserved rows of indexes 56 to 255 in the configuration table of DCI format 2_0 are used to indicate the length of remaining COT. For example, index 57 indicates that the length of the remaining COT is 9 slots and index 58 indicates that the length of the remaining COT is 8 slots. By analogy, index 66 indicates that the length of the remaining COT is 0.

Manner two: The specific bit field of control signaling is used to indicate the length of the remaining MCOT.

For example, 4 bits are defined in DCI to specifically indicate the length of the remaining MCOT. A predefined table may exist between the signaling and the number of remaining slots and the number of symbols of the last slot. For example, 0001 indicates that the number of remaining slots of the MCOT is 1 and the number of remaining symbols is 2.

Information two: An indication of an index of a sub-band for data transmission performed by the base station in one BWP The specific indication method may include the two types described below.

Type one: The sub-band for data transmission is indicated by using a DMRS. The DMRS includes a wideband DMRS and a narrowband DMRS. The DMRS can be independently generated for each sub-band. For example, the DMRS on each sub-band is detected, or a DMRS sequence is detected. Different DMRS sequences represent different sub-bands or combinations of sub-bands for transmission.

Type two: The sub-band for transmission from the base station is indicated through a bit field in DCI signaling.

For example, it is assumed that four bits in the DCI signaling correspond to four sub-bands in one BWP in a bitmap, respectively. When the bit corresponding to a sub-band is 1, the base station performs data transmission on the sub-band. Further, the DCI is transmitted on one sub-band or each sub-band for the data transmission.

Information three: An indication triggering two-step transmission of a PUSCH

After GC-DCI is received within the time window indicated by the first uplink scheduling grant (UL grant), the scheduled PUSCH can be sent. The timing relationship is configured relative to the size of the number of slots and/or number of symbols corresponding to the DCI.

Further, the preceding information is carried by NR DCI format 2_0, and a new DCI format may also be defined to implement the preceding functions and carry the preceding information. Moreover, the detection period or granularity of the PDCCH corresponding to DCI is dynamically switched. The detection granularity before the start of COT and the detection granularity of the first slot after the start of COT are smaller than the detection granularity of the remaining slot of COT. For example, the detection granularity of the PDCCH in the previous period is symbol level, and for the remaining slots of COT, slot detection or more sparse detection is used.

Figure 8:
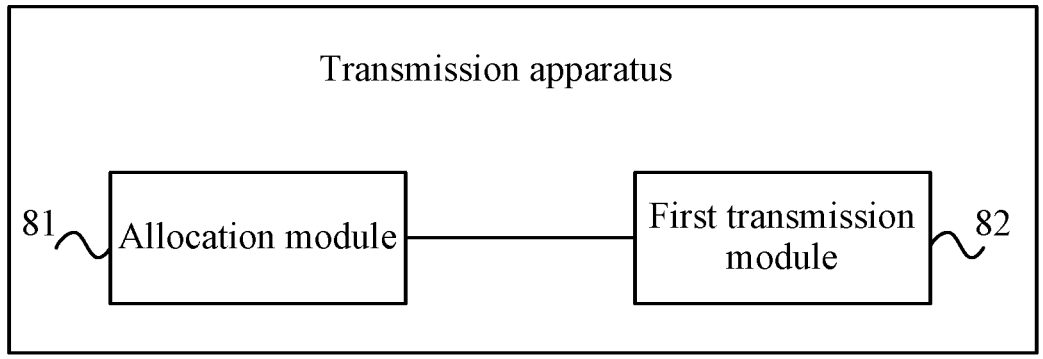
FIG. 8 is a structure diagram of a transmission apparatus according to an embodiment of the present application.

Through the preceding indication signaling, the blind detection of the PDCCH in certain time or frequency domain positions by the UE or the measurement of the channel state information reference signal (CSI-RS) can be reduced, thereby saving the power consumption of the UE. FIG. 8 is a structure diagram of a transmission apparatus according to an embodiment of the present application. As shown in FIG. 8, the transmission apparatus may include an allocation module 81 and a first transmission module 82. The allocation module 81 is configured to allocate to-be-transmitted information to one or more resource subsets of a target transmission resource, where the target transmission resource is divided into a plurality of resource subsets. The first transmission module 82 is configured to transmit corresponding to-be-transmitted information on the one or more resource subsets allocated.

In an example implementation, the first transmission module 82 is further configured to: perform channel access on the allocated at least one resource subset; and transmit the corresponding to-be-transmitted information on a resource subset on which the channel access is successful. In an example implementation, the to-be-transmitted information includes data information; and the allocation module 81 is further configured to schedule a plurality of data channels at a same occasion for a same user equipment and a same target transmission resource, where different data channels are allocated to different resource subsets of the same target transmission resource for transmission.

In an example implementation, the to-be-transmitted information includes data information; and the allocation module 81 is further configured to schedule one data channel at a same occasion for a same user equipment and a same target transmission resource, where each code block group included in the one data channel is allocated to a different resource subset of the target transmission resource for transmission.

In an example implementation, the to-be-transmitted information includes data information; and the allocation module 81 is further configured to schedule a same transport block to a plurality of data channels, where the plurality of data channels are respectively used for transmitting different redundancy versions of the same transport block, and different data channels are allocated to different resource subsets of the target transmission resource for transmission.

In an example implementation, the to-be-transmitted information includes data information; and the allocation module 81 is further configured to schedule a frequency domain position of one data channel onto two or more resource subsets for a same user equipment, where the one data channel is allowed to be transmitted in a case where clear channel assessments of the two or more resource subsets are both successful.

In an example implementation, the first transmission module 82 is further configured to transmit the corresponding to-be-transmitted information on a resource subset on which a clear channel assessment is successful.

In an example implementation, the first transmission module 82 is further configured to: when a channel access contention time window adjustment is performed, not count a NACK proportion of demodulation of a code block group or a transport block corresponding to a resource subset on which a clear channel assessment fails.

In an example implementation, the to-be-transmitted information includes control information, and the allocation module 81 is further configured to configure a plurality of CORESETs for the target transmission resource, where each CORESET is limited in one resource subset for configuration.

In an example implementation, the to-be-transmitted information includes control information; and the allocation module 81 is further configured to limit a to-be-transmitted PDCCH in one resource subset.

In an example implementation, limiting the to-be-transmitted PDCCH in the one resource subset by the allocation module 81 includes at least one of: configuring, through radio resource control (RRC) signaling or a physical broadcast channel (PBCH), the to-be-transmitted PDCCH to use non-interleaved resource mapping; modifying a bundling mechanism of a resource element group (REG) so that a bandwidth of a control channel element (CCE) of the to-be-transmitted PDCCH mapped to the REG is less than a size of the one resource subset; or limiting a hashing process of search space in the one resource subset.

In an example implementation, the to-be-transmitted information includes control information; and the allocation module 81 is further configured to allocate a plurality of physical uplink control channels (PUCCHs) to different resource subsets of the target transmission resource for a same user equipment, where each PUCCH is located in one interleaved element and/or part of interleaved elements in one resource subset.

In an example implementation, downlink control information includes at least one of: a length of remaining MCOT; an index of a resource subset for transmission in the target transmission resource; or an indication triggering two-step transmission of a PUSCH.

In an example implementation, performing resource allocation by the allocation module 81 further includes at least one of: indicating an interleaved element index, and allocating all RBs of one resource subset of an interleaved element to a PUCCH; indicating a resource subset index, and indicating information about an offset of a starting RB of a PUCCH in one resource subset relative to a first RB in the one resource subset; indicating an interleaved element index, and allocating indexes and the number of starting RBs included within at least one interleaved element to a PUSCH; or indicating an interleaved element index, and indicating the number of RBs, offset information of a RB of a PUSCH in a resource subset and an index of a resource subset where the PUSCH is located in at least one interleaved resource.

Figure 9:
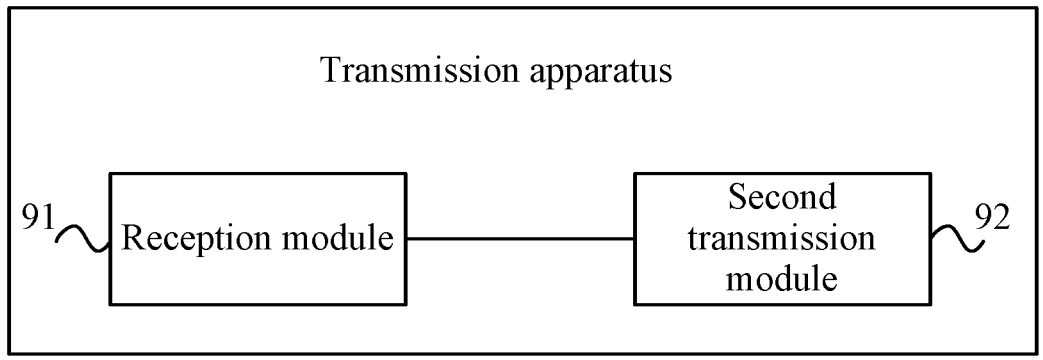
FIG. 9 is a structure diagram of a transmission apparatus according to another embodiment of the present application.

FIG. 9 is a structure diagram of a transmission apparatus according to another embodiment of the present application. As shown in FIG. 9, the transmission apparatus may include a reception module 91 and a second transmission module 92.

The reception module 91 is configured to receive indication information indicating that to-be-transmitted information is allocated to one or more resource subsets of a target transmission resource, where the target transmission resource is divided into a plurality of resource subsets. The second transmission module 92 is configured to transmit the to-be-transmitted information on the one or more resource subsets corresponding to the indication information.

In an example implementation, transmitting the to-be-transmitted information on the one or more resource subsets corresponding to the indication information includes: performing channel access on the one or more resource subsets corresponding to the indication information; and transmitting corresponding to-be-transmitted information on a resource subset on which the channel access is successful.

In an example implementation, the to-be-transmitted information includes data information; and the indication information includes scheduling information about scheduling a plurality of data channels at a same occasion for a same user equipment and a same target transmission resource, where different data channels are allocated to different resource subsets of the same target transmission resource for transmission.

In an example implementation, the to-be-transmitted information includes data information; and the indication information includes scheduling information about scheduling one data channel at a same occasion for a same user equipment and a same target transmission resource, where each code block group included in the one data channel is allocated to a different resource subset of the target transmission resource for transmission.

In an example implementation, the to-be-transmitted information includes data information; and the indication information includes scheduling information about scheduling a same transport block to a plurality of data channels, where the plurality of data channels are respectively used for transmitting different redundancy versions of the same transport block, and different data channels are allocated to different resource subsets of the target transmission resource for transmission.

In an example implementation, the to-be-transmitted information includes data information; and the indication information includes scheduling information about scheduling a frequency domain position of one data channel onto two or more resource subsets for a same user equipment, where the one data channel is allowed to be transmitted in a case where clear channel assessments of the two or more resource subsets are both successful.

In an example implementation, the to-be-transmitted information includes control information; and the indication information includes configuration information about configuring a plurality of control resource sets (CORESETs) for the target transmission resource, where each CORESET is limited in one resource subset for configuration.

In an example implementation, the to-be-transmitted information includes control information; and the indication information includes configuration information about limiting a to-be-transmitted PDCCH in one resource subset.

In an example implementation, the to-be-transmitted information includes control information; and the indication information includes configuration information about allocating a plurality of physical uplink control channels (PUCCHs) to different resource subsets of the target transmission resource for a same user equipment, where each PUCCH is located in one interleaved element and/or part of interleaved elements in one resource subset.

In an example implementation, the indication information includes at least one piece of the following downlink control information: a length of remaining MCOT; an index of a resource subset for transmission in the target transmission resource; or an indication triggering two-step transmission of a PUSCH.

In an example implementation, the indication information further includes at least one piece of the following resource allocation information: an interleaved element index and all RBs of one resource subset of an interleaved element allocated to a PUCCH; a resource subset index and information about an offset of a starting RB of a PUCCH in one resource subset relative to a first RB in the one resource subset; an interleaved element index and indexes and the number of starting RBs included within at least one interleaved element allocated to a PUSCH; or an interleaved element index and the number of RBs, offset information of a RB of a PUSCH in a resource subset and an index of a resource subset where the PUSCH is located in at least one interleaved resource.

In an example implementation, the target transmission resource is a BWP, the resource subset is a sub-band of the BWP, and a bandwidth of the sub-band is less than or equal to a set value.

In this embodiment of the present application, for the function of each module in each apparatus, reference may be made to the corresponding description in the method embodiment described above, and repetition is not made here.

Figure 10:
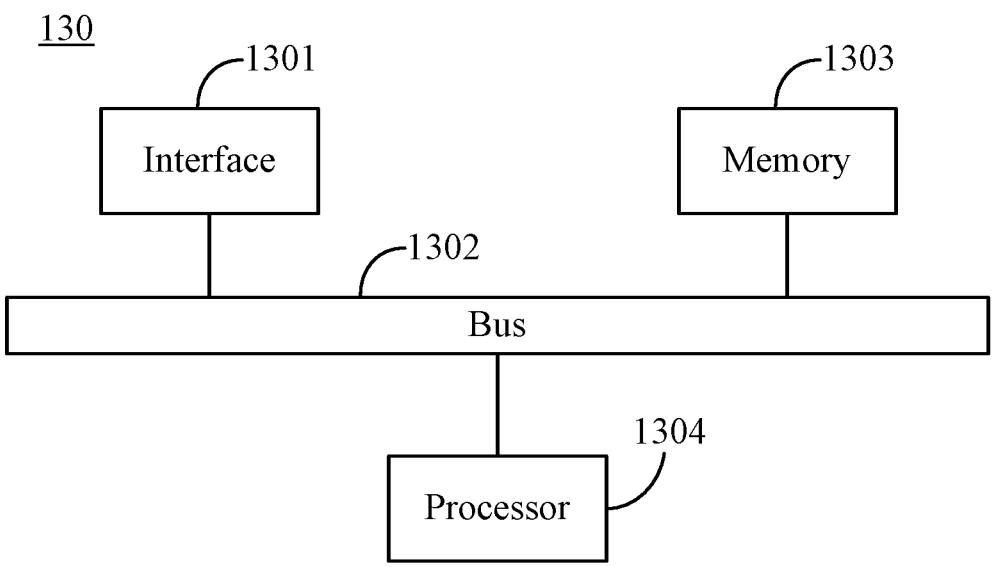
FIG. 10 is a structure diagram of a user equipment according to an embodiment of the present application.

FIG. 10 is a structure diagram of a user equipment according to an embodiment of the present application. As shown in FIG. 10, a user equipment 130 provided by the embodiment of the present application includes a memory 1303 and a processor 1304. The user equipment 130 may further include an interface 1301 and a bus 1302. The interface 1301, the memory 1303 and the processor 1304 are connected through the bus 1302. The memory 1303 is configured to store instructions. The processor 1304 is configured to read the instructions to execute the technical solutions of the preceding method embodiments applied to the user equipment. The implementation principles and technical effects are similar, which is not repeated herein.

Figure 11:
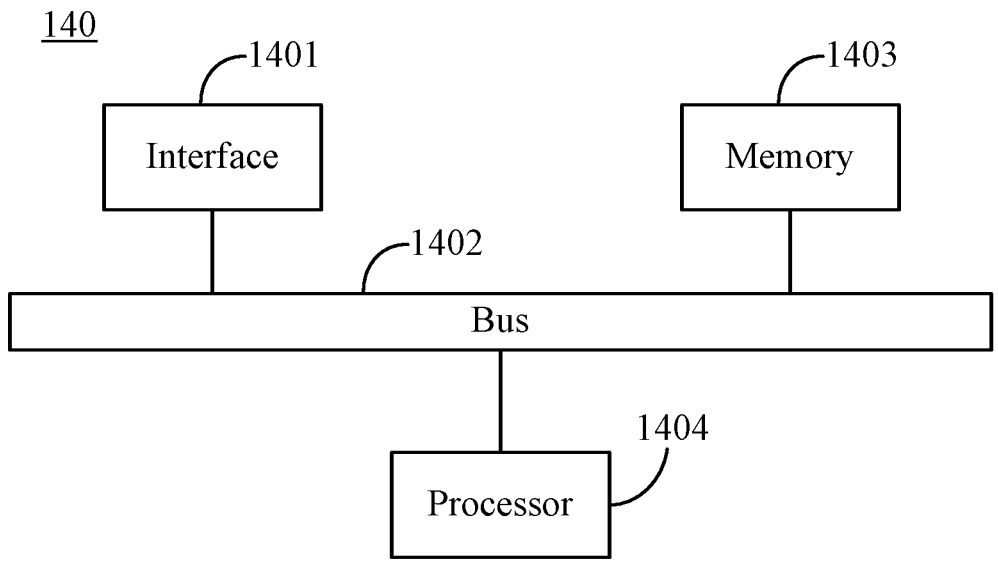
FIG. 11 is a structure diagram of a network device according to an embodiment of the present application.

FIG. 11 is a structure diagram of a network device according to an embodiment of the present application. As shown in FIG. 11, a network device 140 provided by the embodiment of the present application includes a memory 1403 and a processor 1404. The base station may further include an interface 1401 and a bus 1402. The interface 1401, the memory 1403 and the processor 1404 are connected through the bus 1402. The memory 1403 is configured to store instructions. The processor 1404 is configured to read the instructions to execute the technical solutions of the preceding method embodiments applied to the network device. The implementation principles and technical effects are similar, which is not repeated herein.

Figure 12:
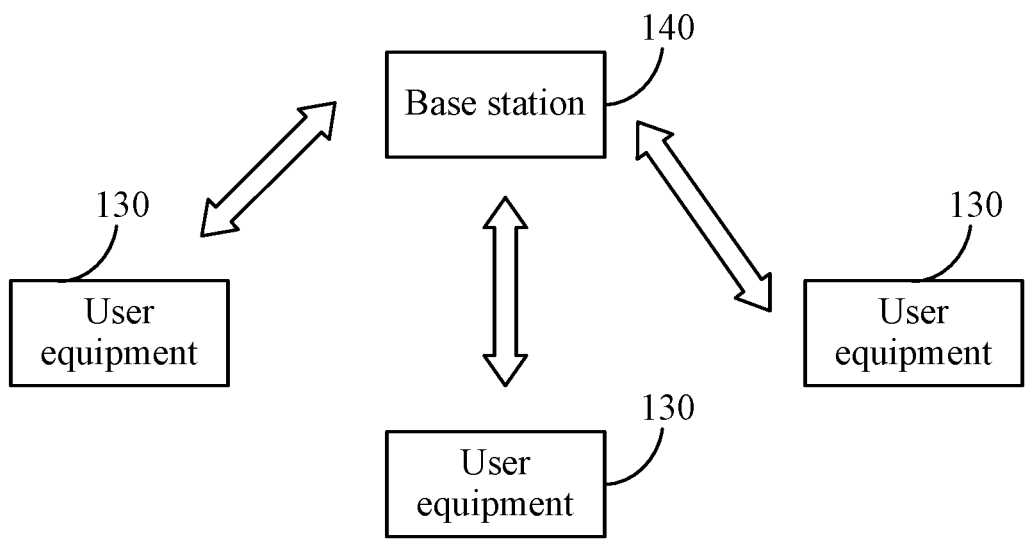
FIG. 12 is a structure diagram of a communication system according to an embodiment of the present application.

FIG. 12 is a structure diagram of a communication system according to an embodiment of the present application. As shown in FIG. 12, the system includes the user equipment 130 of the preceding embodiment and the base station 140 of the preceding embodiment.

The above are merely example embodiments of the present application and are not intended to limit the scope of the present application.

In general, a plurality of embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, although the present application is not limited thereto.

Embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules, and functions, or may represent a combination of program steps, logic circuits, modules, and functions. The computer program may be stored in a memory. The memory may be of any type suitable for a local technical environment and may be implemented using any suitable data storage technology. The memory of the embodiment of the present application may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), a flash memory, or the like.

The volatile memory may be a random-access memory (RAM), which serves as an external cache. Many forms of RAMs may be used, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The memory of the system and the method described herein includes, but is not limited to, these and any other suitable types of memory.

The processor of the embodiment of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA), any other programmable logic device, a discrete gate or transistor logic device, a discrete hardware component, and a processor based on a multi-core processor architecture. The general-purpose processor may be a microprocessor, any conventional processor or the like. The processor may implement or execute steps of the methods disclosed in the embodiments of the present application. The software modules may be located at a RAM, a flash memory, a ROM, a PROM, an EEPROM, a register, or other established storage medium in the art. The storage medium is located in the memory. The processor reads information in the memory and implements the steps of the methods described above in combination with hardware of the processor.

What is claimed is:

1. A transmission method, performed by a base station, comprising:
   generating an indication information that indicates an allocation of at least one resource subset of a bandwidth part (BWP) to a physical uplink shared channel (PUSCH) or a physical uplink control channel (PUCCH), wherein the BWP is divided into a plurality of resource subsets, and the indication information further includes an interleave index of a resource interleave among multiple resource interleaves;
   transmitting the indication information including the interleave index to a user equipment; and
   transmitting a UE-group common downlink control information (DCI) indicating a length of remaining maximum channel occupy time (MCOT) in unit of slots and/or symbols, a subcarrier spacing (SCS) of the slots and/or symbols being a reference SCS for indicating the length of the remaining MCOT.

2. The transmission method of claim 1, wherein the indication information comprises scheduling information about scheduling a frequency domain position of the PUSCH onto at least two resource subsets for the user equipment.

3. The transmission method of claim 1, further comprising mapping a plurality of PUCCHs to different resource subsets of the BWP for the user equipment, wherein each of the plurality of PUCCHs is located in at least one interleaved element in one resource subset among the at least one resource subset.

4. The transmission method of claim 1, wherein the UE group common DCI further comprises:
   an index of a sub-band for transmission in the BWP, wherein the index of the sub-band for transmission is indicated by a bitmap, each bit in the bit map corresponding to a sub-band in the BWP.

5. The transmission method of claim 1, wherein the indication information further indicates a resource subset among the at least one resource subset allocated to the PUCCH in addition to indicating an interleaved element allocated to a PUCCH by the interleave index.

6. The transmission method of claim 1, wherein the indication information indicates an index of a resource subset where the PUSCH is located in at least one interleaved element.

7. A transmission method, comprising:
   receiving, by a user equipment from a base station, indication information indicating that a physical uplink shared channel (PUSCH) or a physical uplink control channel (PUCCH) is mapped to at least one resource subset of a bandwidth part (BWP), wherein the BWP is divided into a plurality of resource subsets, and wherein the indication information includes an interleave index of a resource interleave among multiple resource interleaves;
   transmitting, by the user equipment to the base station, the PUSCH or PUCCH on the at least one resource subset indicated by the indication information including the interleave index; and
   receiving, by the user equipment from the base station, a UE-group common downlink control information (DCI) indicating a length of remaining maximum channel occupy time, MCOT, in unit of slots and/or symbols, a subcarrier spacing (SCS) of the slots and/or symbols being a reference SCS for indicating the length of the remaining MCOT.

8. The transmission method of claim 7, further comprises:
   performing channel access, by the user equipment, on the at least one resource subset indicated by the indication information; and
   transmitting, by the user equipment, the PUSCH or PUCCH on a resource subset on which the channel access is successful.

9. The transmission method of claim 7, wherein the indication information comprises scheduling information about scheduling a frequency domain position of the PUSCH onto at least two resource subsets for the user equipment.

10. The transmission method of claim 7, wherein the indication information comprises configuration information about mapping a plurality of PUCCHs to different resource subsets of the BWP for the user equipment, wherein each of the plurality of PUCCHs is located in at least one interleaved element in one resource subset among the at least one resource subset.

11. The transmission method of claim 7, wherein the UE group common DCI further comprises:
an index of a sub-band for transmission in a BWP, wherein the index of the sub-band for transmission is indicated by a bitmap, each bit in the bit map corresponding to a sub-band in the BWP.

12. The transmission method of claim 7, wherein the indication information further indicates a resource subset among the at least one resource subset allocated to the PUCCH in addition to indicating an interleaved element allocated to the PUCCH by the interleave index.

13. The transmission method of claim 7, wherein the indication information indicates an index of a resource subset where the PUSCH is located in at least one interleaved element.

14. A user equipment, comprising one or more memories for storing computer instructions and one or more processors for executing the computer instructions to:
receive, from a base station, indication information indicating that a physical uplink shared channel (PUSCH) or a physical uplink control channel (PUCCH) is mapped to at least one resource subset of a bandwidth part (BWP), wherein the BWP is divided into a plurality of resource subsets, and wherein the indication information includes interleave index of a resource interleave among multiple resource interleaves;
transmit, to the base station, the PUSCH or PUCCH on the at least one resource subset indicated by the indication information including the interleave index; and
receive, from the base station, a UE-group common downlink control information (DCI) indicating a length of remaining maximum channel occupy time, MCOT, in unit of slots and/or symbols, a subcarrier spacing (SCS) of the slots and/or symbols being a reference SCS for indicating the length of the remaining MCOT.

15. The user equipment of claim 14, wherein the one or more processors are further configured to execute the computer instructions to:
perform channel access on the at least one resource subset indicated by the indication information; and
transmit the PUSCH or PUCCH on a resource subset on which the channel access is successful.

16. The user equipment of claim 14, wherein the indication information comprises scheduling information about scheduling a frequency domain position of the PUSCH onto at least two resource subsets for the user equipment.

17. The user equipment of claim 14, wherein the indication information comprises configuration information about mapping a plurality of PUCCHs to different resource subsets of the BWP for the user equipment, wherein each of the plurality of PUCCHs is located in at least one interleaved element in one resource subset among the at least one resource subset.

18. A transmission device, comprising one or more memories for storing computer instructions and one or more processors for executing the computer instructions to:
generate an indication information that indicates an allocation of at least one resource subsets of a bandwidth part (BWP) to a physical uplink shared channel (PUSCH) or a physical uplink control channel (PUCCH), wherein the BWP is divided into a plurality of resource subsets, and wherein the indication information further includes an interleave index of a resource interleave among multiple resource interleaves;
transmit the indication information including the interleave index to a user equipment; and
transmit a UE-group common downlink control information (DCI) indicating a length of remaining maximum channel occupy time (MCOT) in unit of slots and/or symbols, a subcarrier spacing (SCS) of the slots and/or symbols being a reference SCS for indicating the length of the remaining MCOT.

19. The transmission device of claim 18, further comprising mapping a plurality of PUCCHs to different resource subsets of the BWP for the user equipment, wherein each of the plurality of PUCCHs is located in at least one interleaved element in one resource subset among the at least one resource subset.

20. The transmission device of claim 18, wherein the UE group common DCI further comprises:
an index of a sub-band for transmission in the BWP, wherein the index of the sub-band for transmission is indicated by a bitmap, each bit in the bit map corresponding to a sub-band in the BWP.

* * * * *